US010876633B2

(12) United States Patent
Sakakura et al.

(10) Patent No.: US 10,876,633 B2
(45) Date of Patent: Dec. 29, 2020

(54) MECHANICAL SEAL

(71) Applicant: Nippon Pillar Packing Co., Ltd., Osaka (JP)

(72) Inventors: Hiroyuki Sakakura, Osaka (JP); Junya Okumura, Osaka (JP)

(73) Assignee: Nippon Pillar Co., Ltd., Osaka (JP)

( * ) Notice: Subject to any disclaimer, the term of this patent is extended or adjusted under 35 U.S.C. 154(b) by 110 days.

(21) Appl. No.: 16/313,853

(22) PCT Filed: Apr. 24, 2017

(86) PCT No.: PCT/JP2017/016139
§ 371 (c)(1),
(2) Date: Dec. 27, 2018

(87) PCT Pub. No.: WO2018/003258
PCT Pub. Date: Jan. 4, 2018

(65) Prior Publication Data
US 2019/0154156 A1    May 23, 2019

(30) Foreign Application Priority Data
Jul. 1, 2016    (JP) ................................ 2016-131884

(51) Int. Cl.
*F16J 15/34*    (2006.01)
*F04D 29/12*    (2006.01)
(Continued)

(52) U.S. Cl.
CPC .......... *F16J 15/3404* (2013.01); *F04D 29/12* (2013.01); *F04D 29/58* (2013.01); *F16J 15/10* (2013.01);
(Continued)

(58) Field of Classification Search
CPC ........ F16J 15/3404; F16J 15/34; F16J 15/344; F16J 15/3452; F16J 15/3464; F16J 15/10;
(Continued)

(56) References Cited

U.S. PATENT DOCUMENTS

| | | | | |
|---|---|---|---|---|
| 4,359,111 A | * | 11/1982 | Gonzalez ................. | F16J 15/38 175/227 |
| 2010/0061676 A1 | * | 3/2010 | Sugiyama ............... | F16C 17/14 384/625 |

(Continued)

FOREIGN PATENT DOCUMENTS

| | | |
|---|---|---|
| JP | 61-251585 A | 11/1986 |
| JP | 2002-147617 A | 5/2002 |

(Continued)

OTHER PUBLICATIONS

International Search Report dated Jul. 4, 2017 issued for PCT/JP2017/016139.

*Primary Examiner* — Nathan Cumar
(74) *Attorney, Agent, or Firm* — Norton Rose Fulbright US LLP

(57) ABSTRACT

An end surface-contact mechanical seal providing a shielding seal between a liquid area (A) and an atmospheric area (B) by a relative rotation, while in a contact state, of opposing end surfaces (4a, 6a) of a case-side sealing ring (4), which is fixed to a seal case, and a ceramic shaft-side sealing ring (6), which is held on the sleeve (22) of a rotary shaft (2). A rubber O-ring (5) is installed between a sealing ring-side seal surface (63a), which is formed on the inner peripheral surface of the shaft-side sealing ring (6), and a shaft-side seal surface (22c), which is formed on the outer peripheral surface of the sleeve (22), so as to be relatively movable in the axial direction while sealing the surfaces. A (Continued)

diamond film (14a) is formed over the entire surface of the sealing ring-side seal surface (63a).

7 Claims, 7 Drawing Sheets

(51) Int. Cl.
    *F04D 29/58*     (2006.01)
    *F16J 15/12*     (2006.01)
    *F16J 15/10*     (2006.01)

(52) U.S. Cl.
    CPC ............... *F16J 15/12* (2013.01); *F16J 15/34* (2013.01); *F16J 15/3436* (2013.01)

(58) Field of Classification Search
    CPC .......... F16J 15/104; F16J 15/12; F16J 15/121; F16J 15/122; F16J 15/125; F04D 29/12; F04D 29/08; F04D 29/126; F04D 29/124; F04D 29/122; F04D 29/58; F04D 29/582; F04D 29/586

USPC ........................................................ 277/345
See application file for complete search history.

(56) References Cited

U.S. PATENT DOCUMENTS

| | | | |
|---|---|---|---|
| 2011/0198813 A1* | 8/2011 | Takahashi | F16J 15/3464 |
| | | | 277/387 |
| 2014/0319776 A1* | 10/2014 | Theike | F16J 15/3496 |
| | | | 277/405 |

FOREIGN PATENT DOCUMENTS

| | | |
|---|---|---|
| JP | 2005-172194 A | 6/2005 |
| JP | 2005-180547 A | 7/2005 |
| JP | 2009-156294 A | 7/2009 |
| JP | 2013-167317 A | 8/2013 |
| JP | 2013-249888 A | 12/2013 |
| WO | 2011/036917 A1 | 3/2011 |

* cited by examiner

MECHANICAL SEAL

CROSS REFERENCES TO RELATED APPLICATIONS

This application is a national stage application pursuant to 35 U.S.C. § 371 of International Application No. PCT/JP2017/016139, filed on Apr. 24, 2017 which claims priority under 35 U.S.C. § 119 to Japanese Patent Application No. 2016-131884 filed on Jul. 1, 2016, the disclosures of which are hereby incorporated by reference in their entireties.

TECHNICAL FIELD

The present invention relates to an end surface-contact mechanical seal that is installed as a shaft sealing means in a rotating apparatus, such as various types of industrial pumps, blowers, compressors, stirrers, and so forth.

BACKGROUND ART

Examples of a conventional mechanical seal, end surface-contact mechanical seals, are disclosed in Patent Documents 1 to 4. These mechanical seals are known to be configured such that seal end surfaces, which are the opposing end surfaces of a case-side sealing ring fixed to a seal case and a shaft-side sealing ring held movably in the axial direction on a rotary shaft via an annular packing made of an elastic material, are rotated relative to each other while in contact; and with these seal end surfaces, a shield seal is formed between a liquid area, which is either the inner peripheral area of the seal end surface (hereinafter referred to as an "inner peripheral area") or the outer peripheral area thereof (hereinafter referred to as an "outer peripheral area"), and a gas area, which is on the other side.

More specifically, what is disclosed in FIG. 1 of Patent Document 1 (hereinafter referred to as the "first conventional mechanical seal") is an outside type end surface-contact mechanical seal in which the inner peripheral area is a liquid area and the outer peripheral area is an atmospheric area (gas area).

What is disclosed in FIG. 1 of Patent Document 2 (hereinafter referred to as the "second conventional mechanical seal") and what is disclosed in FIG. 1 of Patent Document 3 (hereinafter referred to as the "third conventional mechanical seal") are an inside type end surface-contact mechanical seal, in which the outer peripheral area is the liquid area and the inner peripheral area is the atmospheric area.

What is disclosed in FIG. 1 of Patent Document 4 (hereinafter referred to as the "fourth conventional mechanical seal") is a floating ring-type end surface-contact mechanical seal, in which the case-side sealing ring is comprised of a stationary ring and a floating ring. The stationary ring is fixed to a seal case, and the floating ring is linked to the stationary ring in such a state that a relative rotation thereof is prevented and is held between the stationary ring and the shaft-side sealing ring, and the seal end surfaces, which are the opposing end surfaces of the shaft-side sealing ring and the floating ring, are rotated relative to each other while in contact, thereby forming a shield seal between the outer peripheral area (the liquid area) and the inner peripheral area (the atmospheric area).

In these first to fourth conventional mechanical seals, a sealing ring-side seal surface that is concentric and parallel to the shaft-side seal surface formed on the outer peripheral surface of the rotary shaft is formed on the inner peripheral part of the shaft-side sealing ring, and the annular packing is provided between the two seal surfaces so as to be able to move relatively in the axial direction. As a result, it is allowed that the shaft-side sealing ring conforms in the axial direction in a state in which the area between it and the rotary shaft is sealed with the annular packing, which affords the proper amount of contact pressure between the shaft-side sealing ring and the mating sealing ring (the case-side sealing ring or the floating ring), so that a good seal function (mechanical seal function) is provided between the liquid area and the gas area (atmospheric area).

PRIOR ART DOCUMENTS

Patent Documents

Patent Document 1: Japanese Patent Application Laid-Open (Kokai) No. 2005-172194
Patent Document 2: Japanese Patent Application Laid-Open (Kokai) No. 2013-249888
Patent Document 3: Japanese Patent Application Laid-Open (Kokai) No. 2002-147617
Patent Document 4: Japanese Patent Application Laid-Open (Kokai) No. 2005-180547

SUMMARY OF INVENTION

Problems to be Solved by the Invention

However, in the first to fourth conventional mechanical seals, the seal is an integrally molded article made of ceramics such as silicon carbide or another such ceramic or of cemented carbide, in which the shaft-side sealing ring has its seal end surface at the distal end portion, and the sealing ring-side seal surface is formed on the inner peripheral part. As a result, the problems below are encountered.

Frictional heat generates at the seal end surface of the shaft-side sealing ring by contact between the seal end surface with the mating sealing ring (which is the case-side sealing ring or the floating ring), and this frictional heat causes the shaft-side sealing ring to become quite hot as a whole. On the other hand, the portion of the liquid area that comes into contact with the liquid, which is the surface portion of the shaft-side sealing ring, is cooled by heat exchange with the liquid. However, since the shaft-side sealing ring is an integrally molded article made of ceramic or cemented carbide, and it is heated for its entirety to a high temperature by the frictional heat, the cooling function produced by contact with the liquid is effectively manifested from the seal end surface to the fluid area; however, the surface temperature of the shaft-side sealing ring on the atmospheric area side does not become very low.

Therefore, since cooling (air cooling) by contact with gas (atmosphere) obviously cannot be expected at the sealing ring-side seal surface of the shaft-side sealing ring in the portion closer to the gas area side than the seal location in contact with the annular packing, and since the sealing ring-side seal is an integrally molded article with high thermal conductivity, even in this portion closer to the liquid area side than the seal location, cooling by contact with the liquid is not performed effectively, and the temperature is extremely high. As a result, the annular packing in contact with the sealing ring-side seal surface is heated, and there is a risk of deterioration (thermal degradation) over long-term use.

In other words, the first to fourth conventional mechanical seals above make use of a rubber O-ring as the annular packing. however, even when an elastic material that is resistant to heat such as a fluorine rubber is used as the material of the O-ring, there is still the risk of deterioration (i.e., a reduced elasticity of the O-ring) in the long term. This problem likewise occurs when a V-ring seal, which is made of a resin (e.g., polytetrafluoro-ethylene (PTFE)) and composed of a main body portion and inner and outer peripheral lips that extend obliquely from the main body portion toward the high pressure fluid side in the inner and outer peripheral directions and that are elastically pressed against the shaft-side seal surface and the sealing ring-side seal surface, is used as the annular packing.

When an O-ring or other such annular packing thus deteriorates, the conformability of the shaft-side sealing ring decreases along with a decrease in the seal function between the rotary shaft and the shaft-side sealing ring, and a good mechanical seal function can not be exhibited.

Incidentally, in the second to fourth conventional mechanical seals, the pressure is higher in the outer peripheral area than in the inner peripheral area; as a result, protrusion of the annular packing from between the seal surfaces toward the inner peripheral area due to the pressure in the outer peripheral area is prevented by a latching surface, which is an annular flat surface formed perpendicular to the seal surface on the inner peripheral part of the shaft-side sealing ring. On the other hand, the shaft-side sealing ring is fitted to the rotary shaft via the annular packing and is thus fitted to the rotary shaft without touching; as a result, the inner peripheral side of the latching surface formed on the inner peripheral part of the shaft-side sealing ring has a gap between this side and the shaft-side seal surface, which is the outer peripheral surface of the rotary shaft. Therefore, when the pressure in the outer peripheral area is at or above a certain level, the inner peripheral portion of the annular packing protrudes from this gap and intrudes into the gap in the direction of the inner peripheral area, compromising the conformability of the shaft-side sealing ring. For this reason, in a floating ring-type end surface-contact mechanical seal or the like used under high pressure conditions, as disclosed in FIG. 1 of Patent Document 4, a backup ring is provided between the latching surface and the annular packing, and this backup ring is snugly fitted to the shaft-side seal surface so that a relative movement is possible in the axial direction, which prevents protrusion of the annular packing from the gap to the inner peripheral area side. PTFE, which has low frictional resistance with respect to the rotary shaft (the shaft-side seal surface), is generally used as a constituent material of the backup ring in order not to hinder the conformability of the shaft-side sealing ring.

However, as described above, since the shaft-side sealing ring, including the sealing ring-side seal surface and the latching surface, becomes hot, creep occurs in which the backup ring in contact with the latching surface is deformed by heating, and there is a risk that the inner peripheral portion thereof protrudes from the gap and intrude into the gap, thus compromising the conformability of the shaft-side sealing ring. Also, if the temperature distribution in the peripheral direction of the latching surface is not uniform, the amount of creep of the backup ring in the peripheral direction becomes uneven, the amount of protrusion from the gap is also inconsistent, and there is a risk that the conformability of the shaft-side sealing ring is adversely affected. In order to mitigate this creep of the backup ring, it has been proposed that this ring be made of PTFE to which a filler such as carbon fiber is added in order to increase the strength of the backup ring. However, when such a PTFE is used, the sliding properties of the backup ring may be diminished, which can lead to wear and damage to the shaft-side seal surface by the contact motion of the backup ring, necessitating the repair or replacement of the rotary shaft, or making it necessary to subject the shaft-side seal surface to a surface hardening treatment, and in any case this drives up the cost.

Accordingly, as disclosed in, for example, Japanese Patent Application Laid-Open (Kokai) No. 2014-20425, such a mechanical seal has been proposed that a titanium retainer ring is shrink-fitted to a shaft-side sealing ring made of ceramic or cemented carbide, a sealing ring-side seal surface is formed on the inner peripheral surface of this retainer ring, and the space between this sealing ring-side seal surface and the shaft-side seal surface on the rotary shaft side is sealed with an annular packing (O-ring). In this mechanical seal, the problem described above does not occur. More specifically, the shaft-side sealing ring is shrink-fitted into a recess formed in the distal end part of the retainer ring, and the contact surface between the shaft-side sealing ring and the retainer ring at this fitting portion is machined to a high level of smoothness; and, except in the shrink-fitted portion, a slight gap (about 30 to 60 μm) occurs at this contact surface. As a result, at the fitting portion between the shaft-side sealing ring and the retainer ring, the atmosphere, that is, air, in the atmospheric area comes in through this gap (except in the shrink-fitted portion). Therefore, while the thermal conductivity is about 60 to 100 W/m·K for the material of which the shaft-side sealing ring is made (ceramic or cemented carbide), it is about 20 W/m·K with titanium, which is the material of which the retainer ring is made, and it is no more than 0.1 W/m·K for air; and as a result, the heat of the shaft-side sealing ring, which has become hot due to the heat of friction with the mating sealing ring, coupled with the fact that the air that has entered the gap functions as an adiabatic material, is hardly transmitted to the retainer ring at all, and the retainer ring does not become hot. Accordingly, by forming the sealing ring-side seal surface not on the shaft-side sealing ring but on the retainer ring shrink-fitted to the shaft-side sealing ring, it is possible to prevent thermal degradation of the O-ring provided between the sealing ring-side seal surface and the shaft-side seal surface. Even when a backup ring made of PTFE is provided between the sealing ring-side seal surface and the shaft-side seal surface, this backup ring is not heated, and no creep due to heat occurs.

The present invention is conceived to solve the above-described problems, and it is an object of the present invention to provide an end surface-contact mechanical seal in which, even if the shaft-side sealing ring is heated by the heat of friction caused by contact with the case-side sealing ring and the shaft-side sealing ring becomes hot, the conformability of the shaft-side sealing ring is ensured and a good mechanical seal function is exhibited over an extended period of time.

Means for Solving the Problems

The present invention provides a mechanical seal that comprises
 a case-side sealing ring fixed to a seal case, and
 a shaft-side sealing ring held on a rotary shaft via an annular packing made of an elastic material, the shaft-side sealing ring being movable in the axial direction of the shaft; and
 the mechanical seal is configured such that the case-side sealing ring and the shaft-side sealing ring are rotated relative to each other while opposing seal end surfaces thereof are in contact, thereby forming a shield seal between a liquid area, which is an area on either the inner or the outer peripheral side of the seal end surfaces, and a gas area, which is on the other side, wherein the shaft-side sealing ring is formed from a ceramic or cemented carbide, the shaft-side sealing ring has a seal end surface formed at the distal end part thereof, and the inner peripheral part of the shaft-side sealing ring has a sealing ring-side seal surface which is concentric and parallel to the shaft-side seal surface which is the outer peripheral surface of the rotary shaft, the annular packing is provided between the sealing ring-side seal surface and the shaft-side seal surface so as to be relatively movable in the axial direction in such a state that a space between the sealing ring-side seal surface and the shaft-side seal surface is sealed is sealed, and a diamond film is formed on the sealing ring-side seal surface.

In the mechanical seal of the present invention, it is preferable that a diamond film contiguous with the above-described diamond film be formed in a continuous manner on a surface portion of the shaft-side sealing ring excluding the seal end surfaces, this surface portion being a portion that comes into contact with a liquid of the liquid area.

Also, it is preferable that, when the outer peripheral area of the seal end surfaces is higher in pressure than the inner peripheral area thereof, protrusion of the annular packing toward the inner peripheral area from between the seal surfaces due to a pressure of the outer peripheral area be prevented by a latching surface which is an annular surface formed perpendicular to the sealing ring-side seal surface on the inner peripheral part of the shaft-side sealing ring and which is spacedly fitted to the shaft-side seal surface, and a diamond film contiguous with the above-described diamond film is formed on this latching surface.

In this case, it is preferable that, when the outer peripheral area is an area of high pressure at or above a certain level, a plastic backup ring be provided between the latching surface and the annular packing, and the plastic backup ring be snugly fitted to the shaft-side seal surface in such a state that a relative movement thereof is possible in the axial direction.

Also, the mechanical seal of the present invention can be configured as a floating ring-type mechanical seal, so that the case-side sealing ring is comprised of a stationary ring, which is fixed to the seal case, and a floating ring, which is linked to the stationary ring with a relative rotation thereof being prevented and provided between the stationary ring and the shaft-side sealing ring. In this structure, a diamond film can be formed on the seal end surface of the shaft-side sealing ring so as to be separated from the above-described diamond film.

Also, in a preferred embodiment of the present invention, a rubber O-ring is used as the annular packing described above.

Also, the diamond film preferably has a thickness of at least 1 µm.

Advantageous Effects of Invention

In the end surface-contact mechanical seal according to the present invention, a diamond film, which has far higher thermal conductivity than a ceramic such as silicon carbide or a cemented carbide, of which the shaft-side sealing ring is made, is formed on the sealing ring-side seal surface of the shaft-side sealing ring that is in contact with the annular packing.

Accordingly, prior to the transmission of frictional heat generated at the seal end surface of the shaft-side sealing ring by contact with the case-side sealing ring to the sealing ring-side seal surface, the temperature of the liquid in the liquid area is transmitted from the part of the sealing ring-side seal in contact with the liquid (the portion closer to the liquid area side than the location in contact with the annular packing) to the entire sealing ring-side seal surface.

In other words, the transfer of frictional heat from the seal end surface to the sealing ring-side seal is blocked off effectively and as much as possible, and the entire sealing ring-side seal surface is substantially dominated by the temperature of the liquid, which is much lower than that of the frictional heat.

As a result, the sealing ring-side seal surface is not heated to a high temperature by frictional heat, and the O-ring or other such annular packing in contact with the sealing ring-side seal surface is not degraded (no thermal degradation).

Therefore, in the end surface-contact mechanical seal of the present invention, good conformability of the shaft-side sealing ring fitted to and held by the rotary shaft via the annular packing is ensured, and a good mechanical seal function is exhibited over an extended period.

EMBODIMENT FOR CARRYING OUT THE INVENTION

Figure 1:
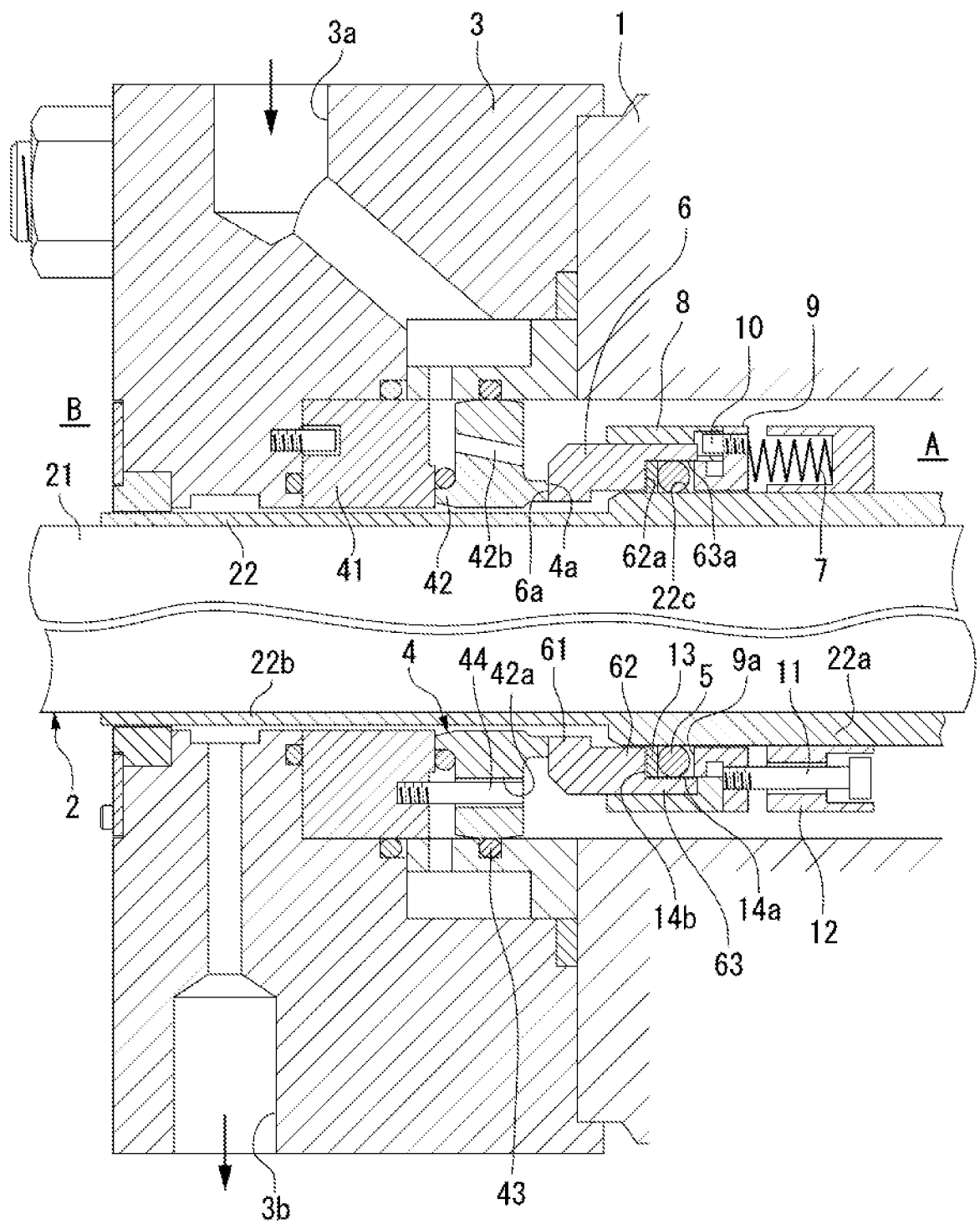
FIG. 1 is a cross sectional view of one example of a mechanical seal according to the present invention.
Figure 2:
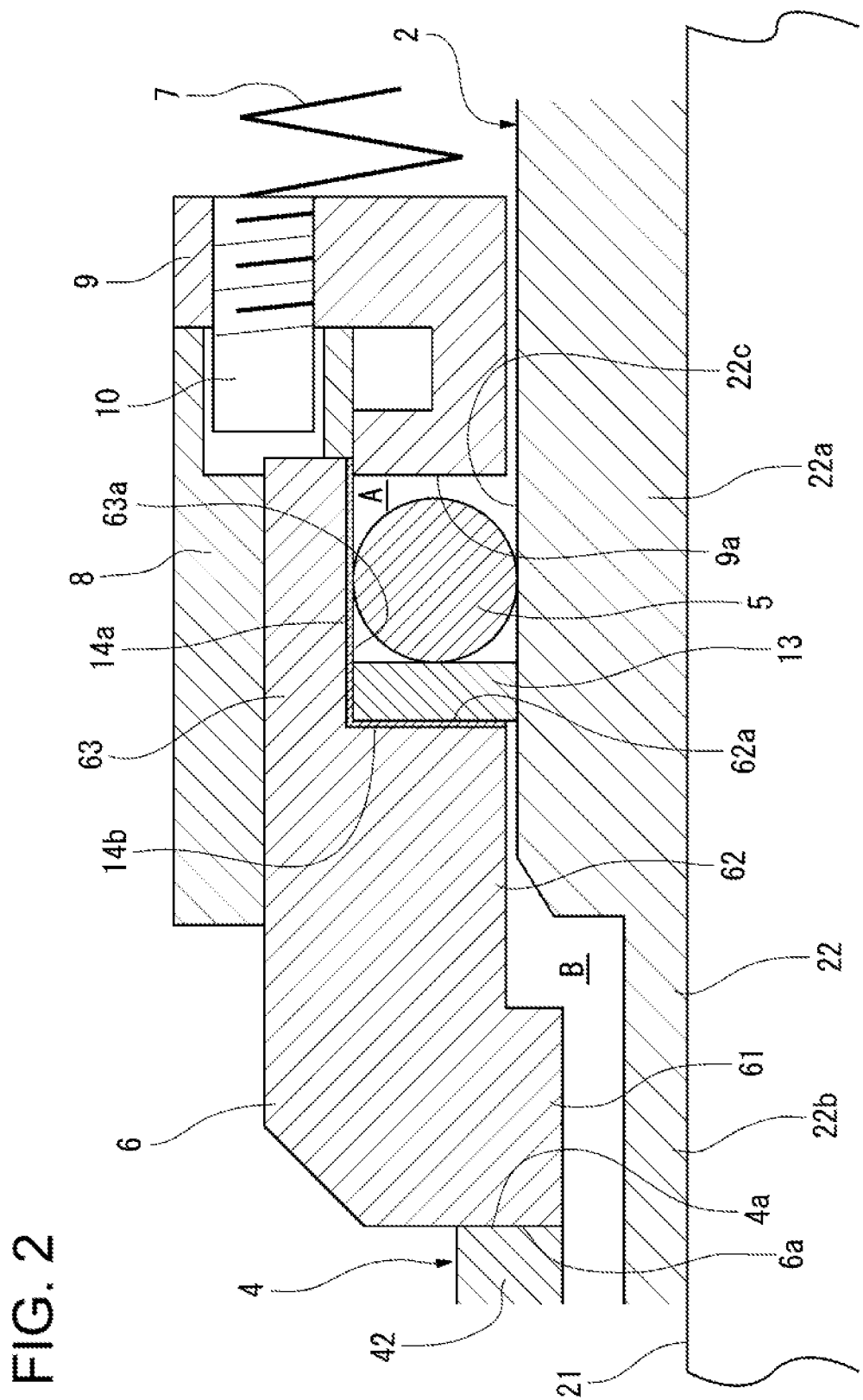
FIG. 2 is a detail enlarged view of the main portion in FIG. 1.

Embodiments of the present invention will now be described in specific terms with reference to the drawings. FIG. 1 is a cross section showing an example of the end surface-contact mechanical seal according to the present invention, and FIG. 2 is a detail enlarged view of the main components of FIG. 1.

The end surface-contact mechanical seal shown in FIG. 1 is provided between a housing 1 and a rotary shaft 2 of a rotating apparatus, and it is comprised of a cylindrical seal case 3 that is attached to the housing 1, a case-side sealing ring 4 that is fixed to the seal case 3, a shaft-side sealing ring 6 that is held movably in the axial direction on the rotary shaft 2 via an annular packing 5 made of an elastic material, and a spring member 7 that presses the shaft-side sealing ring 6 against the case-side sealing ring 4. Also, the end surface-contact mechanical seal is configured such that seal end surfaces 4a and 6a, which are the opposing end surfaces of the two sealing rings 4 and 6, are rotated relative to each other while in contact, thus forming a shield seal between the outer peripheral areas A of the seal end surfaces 4a and 6a and the inner peripheral areas B thereof. The case-side sealing ring 4 is a floating ring-type consisting of a stationary ring 41, which is fixed to the seal case 3, and a floating ring 42, which is linked to the stationary ring 41 in a state that relative rotation is prevented. In the shown example, the outer peripheral area A is a high-pressure liquid area, which is a sealed fluid area, and the inner peripheral area B is an atmospheric area (gas area), which is a non-sealed fluid area.

In the following description, "axis" refers to the center line of the rotary shaft 2, and "axial direction" refers to the direction which is the same as the axis.

The rotary shaft 2 is made of stainless steel or another such metal, and as shown in FIG. 1, it is comprised of a shaft body 21 and a sleeve 22 into which the shaft body 21 is inserted and is fixed thereto. The sleeve 22 has a cylindrical shape, and the proximal end portion 22a is formed thicker than the distal end portion 22b, and the outer peripheral surface of the proximal end portion 22a is formed as a shaft-side seal surface 22c.

As shown in FIG. 2, the shaft-side sealing ring 6 comprises a distal end part 61, which has a distal end formed as a seal end surface 6a and is a smooth annular plane perpendicular to the axis, an intermediate part 62, which is contiguous with the proximal end of the distal end part 61, and a proximal end part 63, which is contiguous with the proximal end of the intermediate part 62. The shaft-side sealing ring 6 is thus a rotary body integrally made of the three parts and molded from a ceramic such as silicon carbide or cemented carbide, In this shaft-side sealing ring 6, the inside diameter of the distal end part 61 is set larger than the outside diameter of the distal end portion 22b of the sleeve 22, and the inside diameters of the intermediate part 62 and proximal end part 63 are set larger than the outside diameter of the proximal end portion 22a of the sleeve 22; and thus the shaft-side sealing ring 6 is fitted to the rotary shaft 2 in a non-contact state. In other words, the intermediate part 62 of the shaft-side sealing ring 6 is fitted in a non-contact state to the proximal end portion 22a of the sleeve 22, with the inside diameter of the intermediate part 62 being made slightly larger than the outer diameter of the proximal end portion 22a of the sleeve 22. Also, the inside diameter of the proximal end part 63 of the shaft-side sealing ring 6 is set larger than the inside diameters of the distal end part 61 and intermediate part 62, and the inner peripheral surface of the proximal end part 63 is formed by a sealing ring-side seal surface 63a that is parallel and concentric with the shaft-side seal surface 22c.

A metal (titanium, etc.) protective ring 8 is shrink-fitted to the intermediate part 62 and the proximal end part 63 of the shaft-side sealing ring 6, and a metal drive collar 9 is connected to this protective ring 8 via a drive pin 10 so as to be incapable of making a relative rotation. A drive pin 11 is attached to the drive collar 9, and this drive pin 11 is engaged with an annular spring retainer 12 that is fixed to the proximal end portion 22a of the rotary shaft 2, so that the shaft-side sealing ring 6 is held via the protective ring 8, the drive collar 9, and the spring retainer 12 so as to be incapable of relative rotation with respect to the rotary shaft 2, while being allowed to move in the axial direction within a specific range.

The annular packing is an O-ring 5 that is made of rubber such as fluorine rubber, and it is installed between the shaft-side seal surface 22c and the sealing ring-side seal surface 63a, which are the opposing peripheral surfaces of the rotating shaft 2 and the shaft-side sealing ring 6, in a compressed state that allows relative movement in the axial direction. With this O-ring 5, the shaft-side sealing ring 6 is held in a state of being fitted to the rotary shaft 2 (the sleeve 22) so as to be movable in the axial direction in such a state that the space between the shaft-side sealing ring 6 and the rotary shaft 2 is sealed by the O-ring 5.

The O-ring 5 is pressed in the direction of the seal end surface 6a of the shaft-side sealing ring 6 by the pressure of the outer peripheral area (liquid area) A; however, the protrusion of the O-ring 5 from the space between the shaft-side seal surface 22c and the sealing ring-side seal surface 63a to the inner peripheral area (atmospheric area) B side that would be caused by this pressing is prevented by the latching surface 62a constituted by the proximal end surface of the intermediate part 62 of the shaft-side sealing ring 6. In other words, the latching surface 62a is an annular plane that is perpendicular to the shaft-side seal surface 22c and sealing ring-side seal surface 63a, and it prevents relative movement of the O-ring 5 toward the seal end surface 6a with respect to the shaft-side sealing ring 6. An annular projection 9a that is inserted between the shaft-side seal surface 22c and the sealing ring-side seal surface 63a is formed on the inner peripheral part of the drive collar 9, and this annular projection 9a prevents relative movement of the O-ring 5 in a direction away from the seal end surface 6a.

As shown in FIG. 2, between the latching surface 62a and the O-ring 5, a plastic backup ring 13 of a constant thickness is provided so that it is between the shaft-side seal surface 22c and the sealing ring-side seal surface 63a. This backup ring 13 is made of, for example, PTFE (a low friction material) and is fitted relatively movable fashion in the axial direction to the rotary shaft 2 (the sleeve 22) in such a state that its inner peripheral surface is in a close contact with the shaft-side seal surface 22c. Therefore, as shown in FIG. 2, the backup ring 13 is held in a state of being in contact with the latching surface 62a of the shaft-side sealing ring 6 by the pressing force of the O-ring 5 due to the pressure of the outer peripheral area (liquid area) A. The backup ring 13 closes the gap between itself and the shaft-side seal surface 22c on the inner peripheral side of the latching surface 62a, that is, the gap formed between the sleeve 22 and the intermediate part 62 of the shaft-side sealing ring 6, thus preventing the inner peripheral portion of the O-ring 5 from protruding or intruding into this gap from the space between the shaft-side seal surface 22c and the sealing ring-side seal surface 63c.

As shown in FIG. 1, the case-side sealing ring 4 is comprised of a metal stationary ring 41, which is fitted and fixed to the seal case 3, and a floating ring 42, which is made of carbon and is connected to the stationary ring 41 so as to be incapable of relative rotation. The floating ring 42 is fitted to the seal case 3 so as to be movable over a specific range in the axial and radial directions with an O-ring 43 interposed, and it is held between the stationary ring 41 and the shaft-side sealing ring 6 which is biased by a spring member 7. The surface of the floating ring 42 that comes into contact with the shaft-side sealing ring 6, or in other words, the surface in contact with the seal end surface 6a, is a seal end surface 4a, which is a smooth annular plane perpendicular to the axis. A drive pin 44 that is attached to the stationary ring 41 is engaged with an engagement hole 42a formed in the floating ring 42, such that the floating ring 42 is connected to the stationary ring 41 so as not to make a relative rotation in a state in which a relative displacement is allowed over a specific range in the axial direction and the radial direction. A through-hole 42b is formed in the floating ring 42 to allow communication between the areas on its both sides, and flushing liquid is supplied from a flushing passage 3a, which is formed in the seal case 3, into the area between the stationary ring 41 and the floating ring 42. In the seal case 3 is formed a drain passage 3b that opens into the inner peripheral area B near the stationary ring 41.

As shown in FIG. 2, in the above-described floating ring-type end surface-contact mechanical seal, a polycrystalline diamond film 14a is formed in a continuous manner over the entire surface of the sealing ring-side seal surface 63a of the shaft-side sealing ring 6.

Furthermore, a polycrystalline diamond film 14b that is contiguous with the diamond film 14a is also formed in a continuous manner over the latching surface 62a of the shaft-side sealing ring 6 as shown in FIG. 2.

The diamond films 14a and 14b preferably have a thickness of 1 μm or greater, and more preferably 1 to 25 μm. If the thickness of the diamond films 14a and 14b is less than 1 μm, it is difficult to effectively realize the heat transfer and cooling effects described below, and if it exceeds 25 μm, it is difficult to sufficiently ensure the strength of the diamond films.

The diamond films 14a and 14b are formed by, for example, hot filament chemical vapor deposition, microwave plasma chemical vapor deposition, high-frequency plasma, direct current discharge plasma, arc discharge plasma jet, combustion flame, or another such method. In the following description, when it is necessary to distinguish between the shaft-side sealing ring 6 and the diamond films 14a and 14b formed thereon, the former shall be referred to as a sealing ring base material.

In the floating ring-type end surface-contact mechanical seal configured as described above, the diamond films 14a and 14b are formed in a continuous manner on the sealing ring-side seal surface 63a and the latching surface 62a; accordingly, even if frictional heat is generated at the seal end surface 6a of the shaft-side sealing ring 6 by contact with the floating ring 42, the sealing ring-side seal surface 63a and the latching surface 62a are not heated to a high temperature.

More specifically, the diamond film that makes up the diamond films 14a and 14b has thermal conductivity which is far higher than that of the silicon carbide or other ceramic or cemented carbide, which is the constituent material of the shaft-side sealing ring (sealing ring base material) 6. In other words, the thermal conductivity of silicon carbide is from 70 to 120 W/mK, whereas the thermal conductivity of diamond film is from 1000 to 2000 W/mK. Therefore, the frictional heat generated at the seal end surface 6a is transmitted along the sealing ring base material to the sealing ring-side seal surface 63a and the latching surface 62a; however, the temperature of the liquid in contact with part of the diamond films 14a and 14b (which is the portion of the diamond film 14a formed on the sealing ring-side seal surface 63a that is closer to the outer peripheral area A (liquid area) than the location in contact with the O-ring 5) is instantly transferred to the entire diamond films 14a and 14b, and this heat transfer (hereinafter referred to as "liquid temperature heat transfer") is performed prior to heat transfer to the sealing ring-side seal surface 63a and the latching surface 62a due to frictional heat (hereinafter referred to as "frictional heat transfer"). Therefore, the sealing ring-side seal surface 63a and the latching surface 62a are effectively shielded from liquid temperature heat transfer by this frictional heat transfer as much as possible, and the sealing ring-side seal surface 63a and the latching surface 62a are substantially dominated by the temperature of the liquid, which is much lower than that of the frictional heat.

Accordingly, the sealing ring-side seal surface 63a and the latching surface 62a are prevented as much as possible from being subjected to high-temperature frictional heat and are maintained at or cooled to the low liquid temperature, so that thermal degradation of the O-ring 5 in contact with the sealing ring-side seal surface 63a and creep of the backup ring 13 in contact with the latching surface 62a are suppressed. In addition, since the entire surface of the latching surface 62a is held at a uniform temperature by the diamond film 14b, even if creep should occur in the backup ring 13 which is in contact with the latching surface 62a, the amount of creep does not become uneven in the peripheral direction of the backup ring 13, and no distortion or deformation occurs in the backup ring 13.

From the above standpoint, in the above-described floating ring-type end surface-contact mechanical seal, the conformability of the shaft-side sealing ring 6 by the O-ring 5 and the backup ring 13 is properly ensured, and a good mechanical sealing function is realized over an extended period.

The end surface-contact mechanical seal, which has as seen from FIG. 2 the structure that the diamond films 14a and 14b are formed on the sealing ring-side seal surface 63a and the latching surface 62a, is usable under such conditions that the outer peripheral area A is a gas area, which is higher in pressure than the inner peripheral area B, and the inner peripheral area B is a liquid area. In other words, the same cooling effect as described above is achievable, since the diamond film 14b of the latching surface 62a and the portion of the diamond film 14a, which is on the backup ring 13 side from the location with which the O-ring 5 is in contact, are brought into contact with the liquid in the inner peripheral area B.

The configuration of the present invention is not limited to or by the embodiment described above and can be appropriately improved and modified without departing from the basic principle of the present invention. Modification examples of the present invention will be described below.

Figure 3:
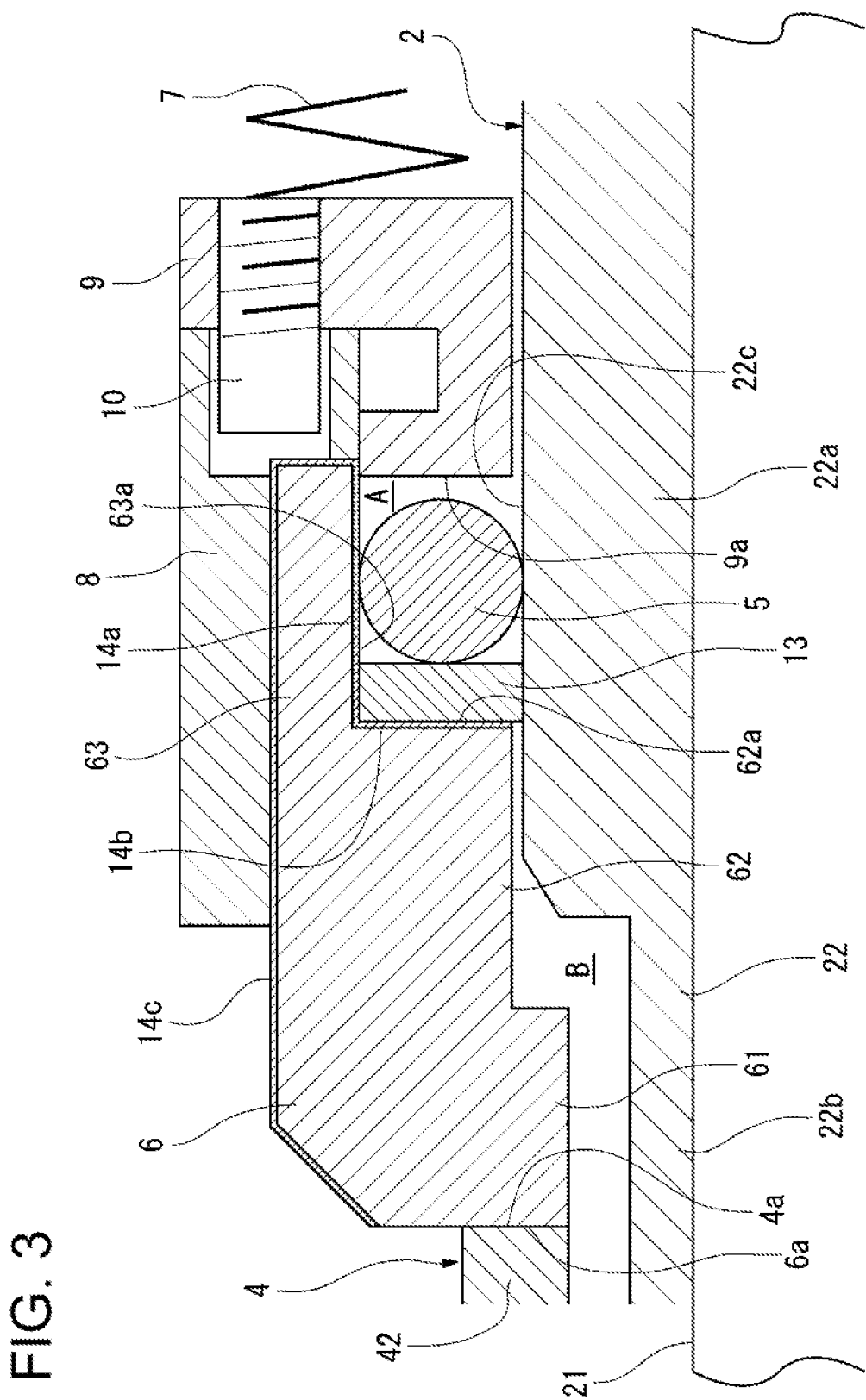
FIG. 3 is a cross sectional view of the main portion corresponding to FIG. 2 and shows a modification example of the mechanical seal according to the present invention.

For example, as shown in FIG. 3, a diamond film 14c that is contiguous with the diamond films 14a and 14b can be formed in a continuous manner on a surface portion of the shaft-side sealing ring 6, excluding the seal end surface 6a, the sealing ring-side seal surface 63a, and the latching surface 62a, with this surface portion being in contact with the liquid in the outer peripheral area A. This structure provides more pronounced effect of blocking frictional heat transfer and of cooling the sealing ring-side seal surface 63a and the latching surface 62a, even if the contact surface area between the liquid and the diamond films 14a, 14b, and 14c is increased.

Figure 4:
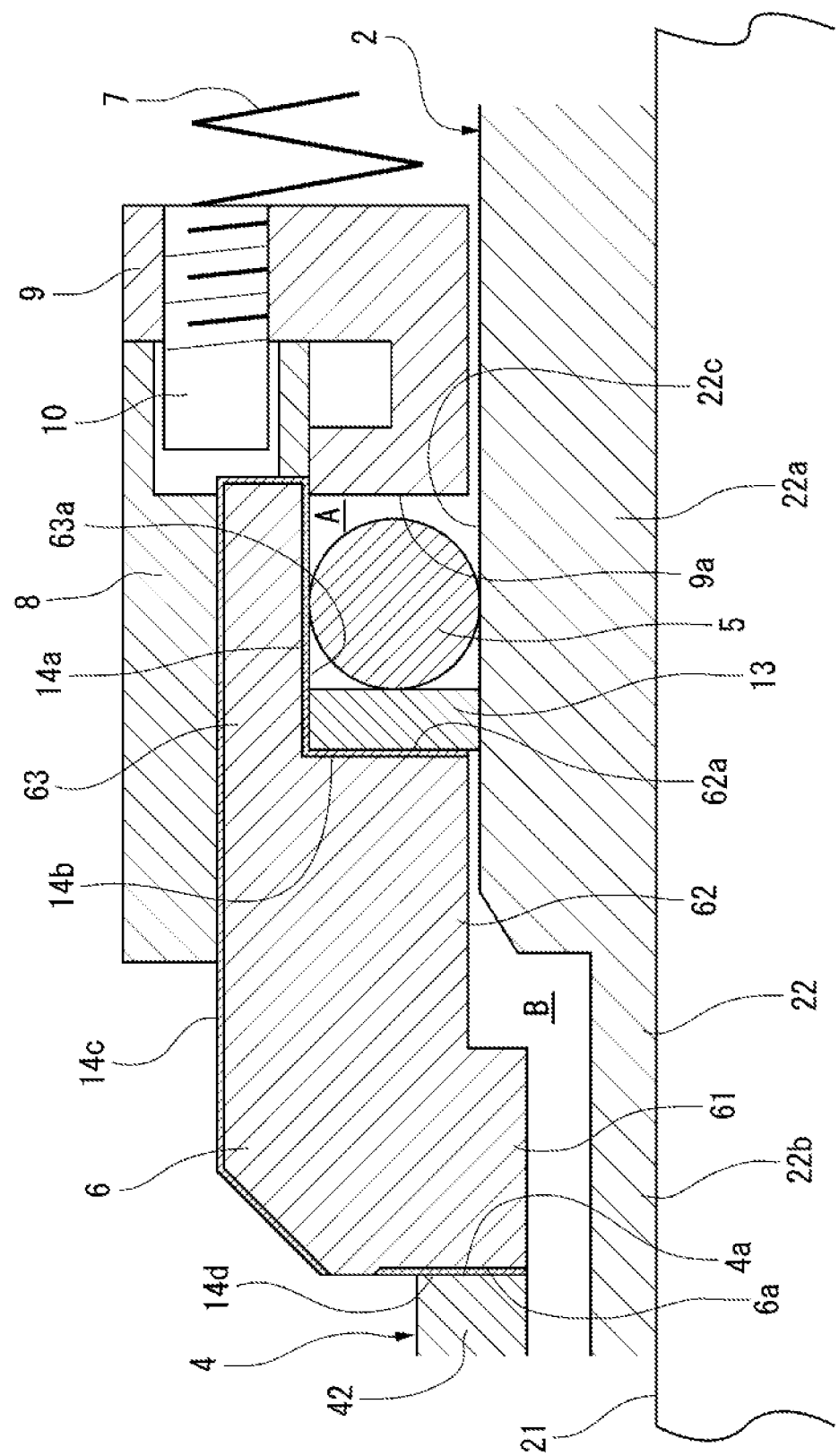
FIG. 4 is a cross sectional view of the main portion corresponding to FIG. 2 and shows another modification example of the mechanical seal according to the present invention.

Furthermore, as shown in FIG. 4, a diamond film 14d can be formed on the seal end surface 6a in addition to the diamond films 14a, 14b, and 14c. In the structure in which the seal end surface 6a is thus covered with the diamond film 14d, since the coefficient of friction of diamond film is far lower than that of a ceramic such as silicon carbide or a cemented carbide, which is the constituent material of the shaft-side sealing ring 6 (the coefficient of friction (μ) of diamond film is generally 0.03, which is even lower than that of PTFE, whose coefficient of friction is much lower than that of a ceramic or a cemented carbide), extremely little heat (and wear) is generated by the relative rotation and sliding with the case-side sealing ring 4, and the influence of frictional heat transfer on the sealing ring-side seal surface 63*a* and the latching surface 62*a* is further reduced. In this case, this diamond film 14*d* is preferably formed in an independent form so that it is not contiguous with the diamond films 14*a*, 14*b*, and 14*c*. The reason is that the frictional heat generated at the seal end surface 6*a* is transferred from the diamond film 14*d* to the diamond films 14*a*, 14*b*, and 14*c*, and the effect of cooling the sealing ring-side seal surface 63*a* and the latching surface 62*a* is diminished.

Figure 5:
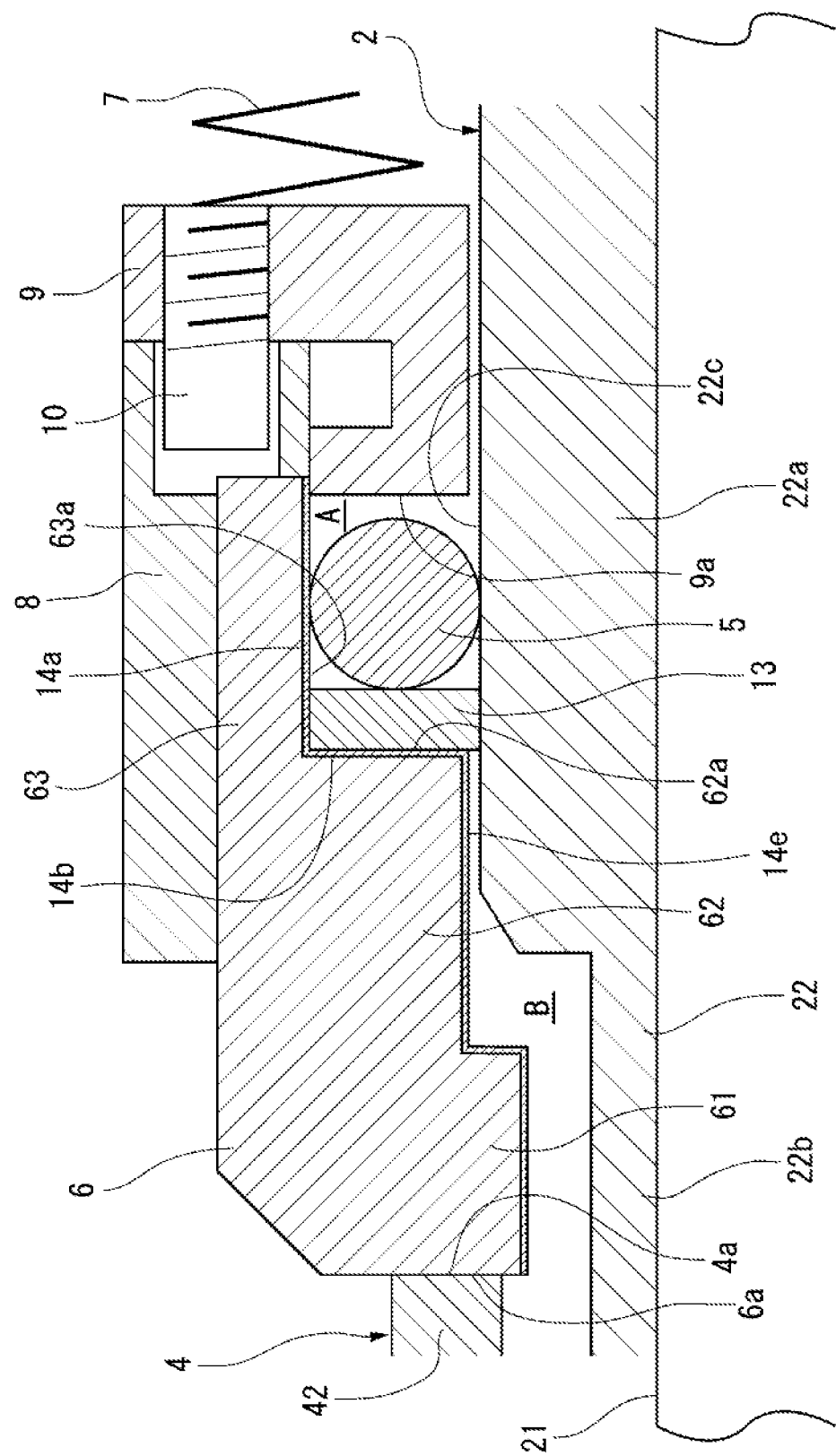
FIG. 5 is a cross sectional view of the main portion corresponding to FIG. 2 and shows yet another modification example of the mechanical seal according to the present invention.

Next, a modification example in which the outer peripheral area A is a gas area that is higher in pressure than the inner peripheral area B, and the inner peripheral area B is a liquid area, as described above, will be described. As shown in FIG. 5, a diamond film 14*e* that is contiguous with the diamond films 14*a* and 14*b* is formed in a continuous manner on the surface portion of the shaft-side sealing ring 6 excluding the seal end surface 6*a*, the sealing ring-side seal surface 63*a*, and the latching surface 62*a*, with this surface portion being in contact with the liquid in the inner peripheral area B. In this structure, the contact surface area with the liquid is increased by the diamond film 14*e*, so that the effect of blocking frictional heat transfer and the effect of cooling the sealing ring-side seal surface 63*a* and the latching surface 62*a* are more pronounced.

Figure 6:
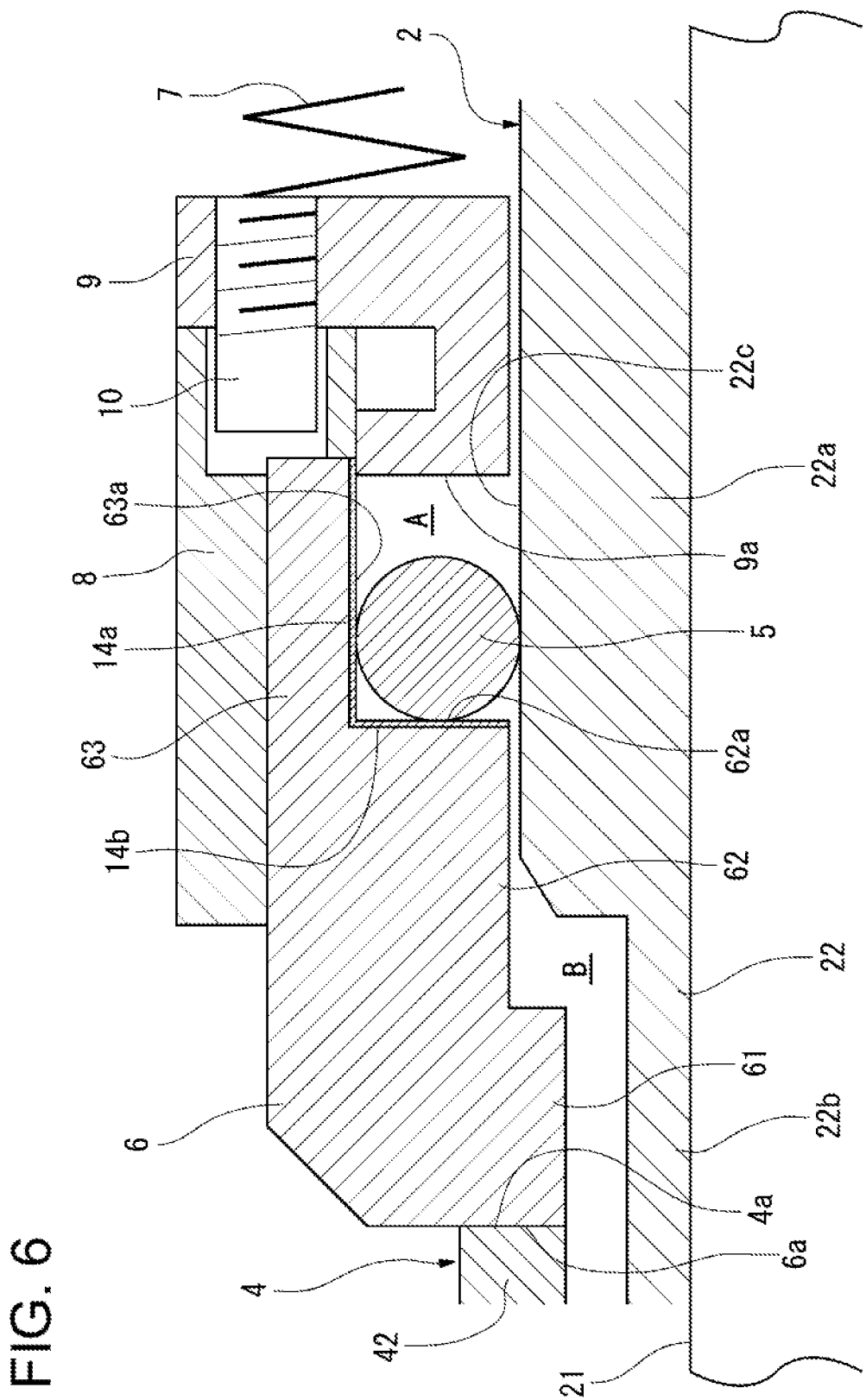
FIG. 6 is a cross sectional view of the main portion corresponding to FIG. 2 and shows still another modification example of the mechanical seal according to the present invention.

The present invention is applicable also to an end surface-contact mechanical seal in which the backup ring 13 is not used. In this case, regardless of whether the outer peripheral area A or the inner peripheral area B is the liquid area, as shown in FIG. 6, the diamond film 14*a* is formed over at least the entire surface of just the sealing ring-side seal surface 63*a*. Nonetheless, the diamond film 14*b* that is contiguous with the diamond film 14*a* is preferably formed on the latching surface 62*a* in addition to the sealing ring-side seal surface 63*a*. This is because the O-ring 5 is in contact with the diamond film 14*b* of the latching surface 62*a* and is further cooled. Here again, a diamond film the same as the diamond film 14*c* shown in FIG. 3 or the diamond film 14*e* shown in FIG. 5 can be indeed formed in a continuous manner on the surface portion of the shaft-side sealing ring 6 excluding the seal end surface 6*a*, the sealing ring-side seal surface 63*a* and the latching surface 62*a*, with this surface portion being in contact with the liquid in the liquid area (the outer peripheral area A or the inner peripheral area B).

Furthermore, the present invention is not limited to a floating ring-type end surface-contact mechanical seal in which the case-side sealing ring 4 is configured so that the stationary ring 41 and the floating ring 42 are separated, and it can be favorably applicable to an end surface-contact mechanical seal in which the case-side sealing ring 4 has a unit construction, as disclosed in Patent Documents 1 to 3. Furthermore, the present invention is also applicable to an end surface-contact mechanical seal in which the rotary shaft 2 holding the shaft-side sealing ring 6 is made up of the shaft body 21 only and has no sleeve 22 as shown in FIG. 1 of Patent Document 3.

Figure 7:
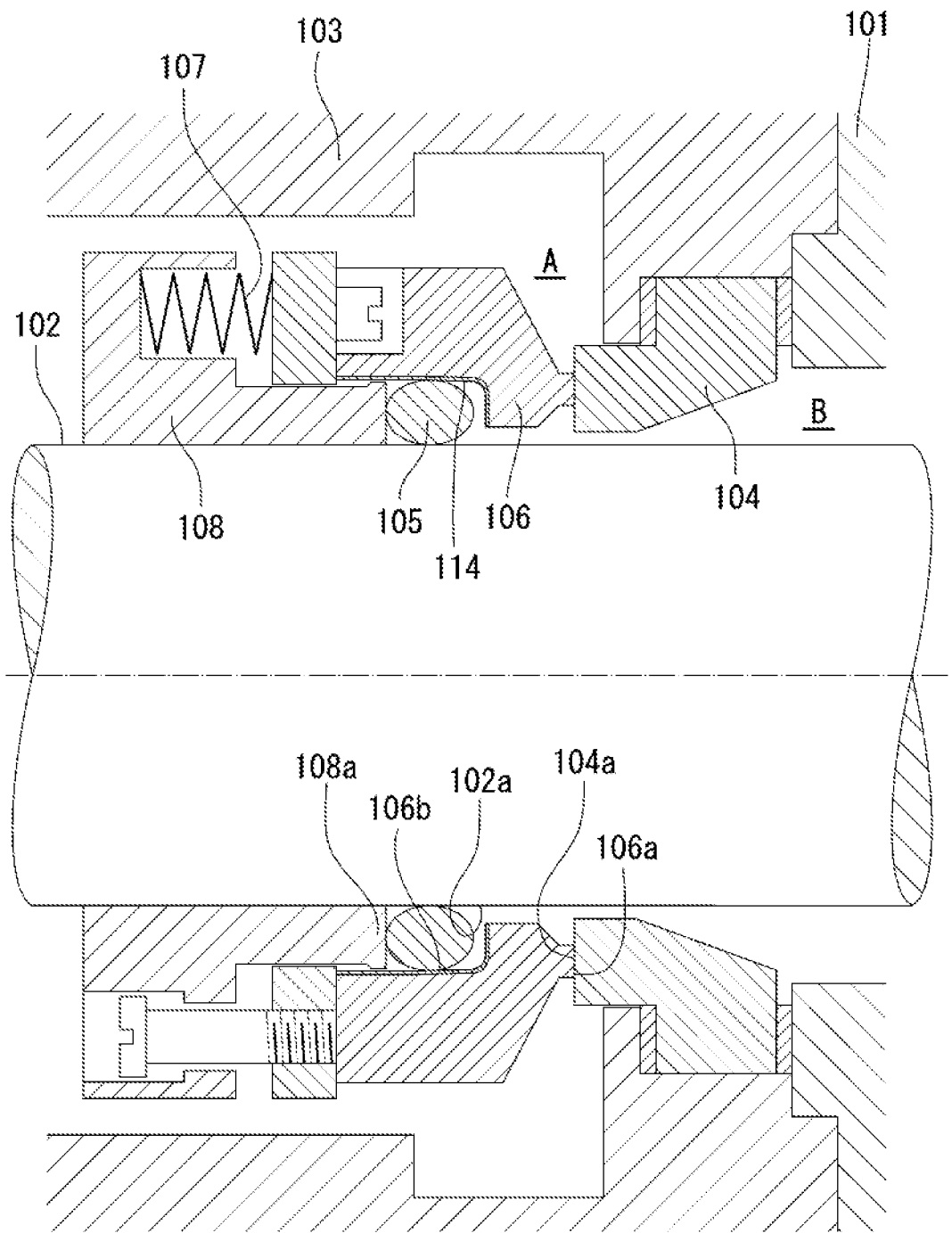
FIG. 7 is a cross sectional view of still another modification example of the mechanical seal according to the present invention.

For example, the end surface-contact mechanical seal shown in FIG. 7 is of an outside type; and it comprises a seal case 103 that is attached to the housing of a rotating apparatus 101, a case-side sealing ring 104 that is fixed to the seal case 103, a shaft-side sealing ring 106 that is held by a rotary shaft 102 having no sleeve so as to be movable in the axial direction via a rubber O-ring 105 (annular packing), and a spring member 107 that is interposed between the shaft-side sealing ring 106 and a spring holder ring 108, which is fixed to the rotary shaft 102, so as to bias the shaft-side sealing ring 106 and press it against the case-side sealing ring 104.

In this structure, a shield seal is formed by a relative rotation sliding action produced when seal end surfaces 104*a* and 106*a*, which are the opposing end surfaces of the sealing rings 104 and 106, rotate relative to each other while in contact, between an atmospheric area A, which is the outer peripheral area of the seal end surface relative rotation and sliding contact portions 104*a* and 106*a*, and a liquid area (sealed fluid area) B, which is the inner peripheral area thereof.

Also, this end surface-contact mechanical seal is configured such that the O-ring 105 is provided in a compressed state between a shaft-side seal surface 102*a*, which is the outer peripheral surface of the rotary shaft 102, and a sealing ring-side seal surface 106*b*, which is formed on the inner peripheral surface of the shaft-side sealing ring 106 and is concentric and parallel with the shaft-side seal surface 102*a*, and such that protrusion from between the seal surfaces 102*a* and 106*b* produced by the pressure of the liquid area B is prevented by an annular latching part 108*a* that projects into the inner periphery of the spring holder ring 108.

In this outside type end surface-contact mechanical seal, a diamond film 114 is formed over the entire surface of the sealing ring-side seal surface 106*b*, and the liquid in the inner peripheral area B comes into contact with part of this diamond film 114 (which is the portion of the sealing ring-side seal surface 106 that is closer to the seal end surface 106*a* than the location in contact with the O-ring 105), which prevents thermal deterioration of the O-ring 105 as much as possible, as described above. Again in this end surface-contact mechanical seal, as shown in FIG. 5, a diamond film that is contiguous with the above-described diamond film 114 can be formed on the surface portion of the shaft-side sealing ring 106, with this surface portion being in contact with the liquid in the inner peripheral area B, excluding the seal end surface 106*a*.

Furthermore, a diamond film that is independent of these diamond films can be formed on the seal end surface 106*a*.

Also, the present invention is applicable to an end surface-contact mechanical seal in which the above-described plastic (PTFE or the like) V-ring seal is used as the annular packing 5.

DESCRIPTION OF REFERENCE SIGNS

2 Rotary shaft of rotating apparatus
3 Seal case
4 Case-side sealing ring
4*a* Seal end surface of case-side sealing ring
5 O-ring (annular packing)
6 Shaft-side sealing ring
6*a* Seal end surface of shaft-side sealing ring
13 Backup ring
14*a* Diamond film
14*b* Diamond film
14*c* Diamond film
14*d* Diamond film
14*e* Diamond film
41 Stationary ring
42 Floating ring 62a Latching surface
63a Sealing ring-side seal surface
102 Rotary shaft of rotating apparatus
102a Shaft-side seal surface
103 Seal case
104 Case-side sealing ring
104a Seal end surface of case-side sealing ring
105 O-ring (annular packing)
106 Shaft-side sealing ring
106a Seal end surface of shaft-side sealing ring
106b Sealing ring-side seal surface
114 Diamond film
A Outer peripheral area
B Inner peripheral area

The invention claimed is:

1. A mechanical seal, comprising:
a case-side sealing ring fixed to a seal case, the case-side sealing ring including a case-side sealing ring seal end surface; and
a shaft-side sealing ring held on a rotary shaft via an annular packing made of an elastic material, the shaft-side sealing ring being movable in an axial direction of the rotary shaft, and the shaft-side sealing ring including a shaft-side sealing ring seal end surface;
wherein:
  the case-side sealing ring and the shaft-side sealing ring are configured to be rotated relative to each other while the case-side sealing ring seal end surface and the shaft-side sealing ring seal end surface are in contact, thereby forming a shield seal between a liquid area and a gas area, wherein the liquid area is one of an inner peripheral area and an outer peripheral area of the case-side sealing ring seal end surface and the shaft-side sealing ring seal end surface, and the gas area is a different one of the inner peripheral area and the outer peripheral area of the case-side sealing ring seal end surface and the shaft-side sealing ring seal end surface, the gas area different than the liquid area;
  the shaft-side sealing ring is formed from a ceramic or cemented carbide;
  the shaft-side sealing ring seal end surface is formed at a distal end part thereof, and an inner peripheral part of the shaft-side sealing ring has a sealing ring-side seal surface which is concentric and parallel to a shaft-side seal surface which is an outer peripheral surface of the rotary shaft;
  the annular packing is provided between the sealing ring-side seal surface and the shaft-side seal surface so as to be relatively movable in the axial direction in such state that a space between the sealing ring-side seal surface and the shaft-side seal surface is sealed; and
  a diamond film is formed on the sealing ring-side seal surface.

2. The mechanical seal according to claim 1, wherein a diamond film contiguous with the diamond film formed on the sealing ring-side seal surface is formed on a surface portion of the shaft-side sealing ring excluding the shaft-side sealing ring seal end surface, the surface portion being a portion that is in contact with a liquid of the liquid area.

3. The mechanical seal according to claim 1, wherein:
  the shaft-side sealing ring is formed on the inner peripheral part thereof with a latching surface which is an annular surface perpendicular to the sealing ring-side seal surface of the shaft-side sealing ring and is not in contact with the shaft-side seal surface, the latching surface configured to prevent protrusion of the annular packing toward the inner peripheral area from between the sealing ring-side seal surface and the shaft-side seal surface due to a pressure of the outer peripheral area when the outer peripheral area of the shaft-side sealing ring seal end surface and the case-side sealing ring seal end surface is higher in pressure than the inner peripheral area thereof; and
  a diamond film contiguous with the diamond film formed on the sealing ring-side seal surface is formed on the latching surface.

4. The mechanical seal according to claim 3, wherein between the latching surface and the annular packing, a plastic backup ring is fitted to the shaft-side seal surface in such a state that a relative movement thereof is possible in the axial direction.

5. The mechanical seal according to claim 1, wherein the case-side sealing ring is comprised of a stationary ring, which is fixed to the seal case, and a floating ring, which is linked to the stationary ring in such a state that a relative rotation with the stationary ring is prevented, and which is provided between the stationary ring and the shaft-side sealing ring.

6. The mechanical seal according to claim 1, wherein the annular packing is a rubber O-ring.

7. The mechanical seal according to claim 1, wherein the diamond film has a thickness of at least 1 μm.

* * * * *